United States Patent
Fletcher et al.

(10) Patent No.: US 8,923,801 B2
(45) Date of Patent: Dec. 30, 2014

(54) METHOD BY WHICH PSAPS CAN IDENTIFY AND REQUEST INFORMATION FROM CELLULAR DEVICES THAT ARE NEAR EMERGENT EVENTS

(75) Inventors: Mark J. Fletcher, Ringwood, NJ (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 712 days.

(21) Appl. No.: 13/217,678

(22) Filed: Aug. 25, 2011

(65) Prior Publication Data

US 2013/0052983 A1    Feb. 28, 2013

(51) Int. Cl.
| | |
|---|---|
| *H04M 11/04* | (2006.01) |
| *H04W 4/02* | (2009.01) |
| *H04L 29/08* | (2006.01) |
| *H04M 3/00* | (2006.01) |
| *H04W 4/22* | (2009.01) |

(52) U.S. Cl.
CPC ............... *H04W 4/22* (2013.01); *H04W 4/021* (2013.01); *H04L 67/303* (2013.01); *H04M 3/00* (2013.01)

USPC ................... 455/404.1; 455/404.2; 455/456.1

(58) Field of Classification Search
CPC ......... H04W 4/22; H04W 4/021; H04M 3/00; H04L 67/303
USPC ................ 455/403, 404.1, 404.2, 456.1–457, 455/422.1
See application file for complete search history.

(56) References Cited

U.S. PATENT DOCUMENTS

| | | | |
|---|---|---|---|
| 2006/0030290 A1* | 2/2006 | Rudolf et al. ............. | 455/404.1 |
| 2007/0135089 A1* | 6/2007 | Edge et al. ................. | 455/404.1 |
| 2008/0132224 A1* | 6/2008 | Gallagher et al. ......... | 455/422.1 |
| 2011/0171924 A1* | 7/2011 | Faccin et al. .............. | 455/404.1 |

\* cited by examiner

*Primary Examiner* — Ajit Patel
(74) *Attorney, Agent, or Firm* — Sheridan Ross P.C.

(57) ABSTRACT

When a PSAP receives a call from a cellular telephone in reference to an emergent event, the speed and quality of the response may be improved by the cellular service provider's provision to the PSAP of information that includes the geographic location of the caller's phone. In a typical scenario, in which the call is from a GPS-equipped phone, the GPS coordinates of the phone may be echoed back to the PSAP in response to a specialized open "ping" request from the service provider. Of particular advantage to this approach is that GPS ping requests typically work regardless of whether a call is in progress, as long as the phone is turned on.

20 Claims, 3 Drawing Sheets

METHOD BY WHICH PSAPS CAN IDENTIFY AND REQUEST INFORMATION FROM CELLULAR DEVICES THAT ARE NEAR EMERGENT EVENTS

BACKGROUND

People who call a 9-1-1 Public Safety Answering Point (PSAP) to report an incident often cannot be relied upon to describe the incident calmly and accurately. For this reason, emergency responses personnel who are dispatched to the site of an incident may not have a clear idea of what to expect prior to arriving at the scene, a common problem being the unreported presence of hazardous materials. In response to this problem, some PSAPs have implemented the ability to receive photographs from the cell phones of individuals who have contacted the PSAP.

SUMMARY

One issue that detracts from the usefulness of this approach is that there is tremendous variation in the non-voice capabilities of cell phones. The person or people who call 9-1-1 to report an incident will not necessarily be calling from devices that are optimally suited to the PSAP's information-gathering needs. For example, the pixel resolution and low-light capabilities of the built-in cameras on smart phones can vary significantly. Some cameras are limited to still-image photography while others are capable of streaming video. Some cell phones/smart phones have highly accurate GPS systems. Some cell phones have a compass function that can indicate precisely the direction in which the camera is pointed, and so on.

When a situation that requires an emergency response is seen by many people—for example a train derailment or a building on fire—it is reasonable to expect that at least some of the witnesses have sophisticated GPS-equipped, camera-equipped, or video-equipped mobile communication devices. One of the exemplary problems addressed by the proposed techniques is that many of the people who have the ability to provide key non-voice information to the PSAP do not call 9-1-1, often because they believe that the emergency has already been reported.

One capability that already exists, which is leveraged by the proposed techniques, is that cellular service providers maintain real-time databases that include the identity, e.g. the telephone number, of the devices they service. An addition to this information enabled by the disclosed techniques includes the location (either GPS or cell tower registration), and exact capabilities of every mobile device that is active on their network. One exemplary key element of the proposed solution is that when an incident that is likely to be viewable by a large number of people is first reported to a PSAP, a PSAP that has real-time access to the service provider database could "know" the non-voice (e.g., video) capabilities of the cellular devices that are near the incident. By "knowing" which devices are in a position and have the non-voice resources to provide useful information, a PSAP with the ability to selectively contact those devices could gain an understanding of the emergency far more quickly than is possible today—regardless of whether the information is obtained from a device that called the PSAP, or requested from a device in close proximity to the incident that is called by the PSAP.

The manner in which PSAPs typically handle incoming calls is generally described above. A typical PSAP has access to only two pieces of information beyond what is reported by the caller: the identity of the calling party's device and the assumed location of the incident provided by a 9-1-1 caller. The availability of additional information, from other sources other than the original caller, would make it easier for PSAPs to access and respond appropriately to emergent situations.

With regard to a PSAP's ability to initiate calls to devices that may be geographically near an emergency—the so-called "reverse 9-1-1" function—PSAPs rely on the public switch telephone network Master Street Address Guide (MSAG) and other telephone company related database information to identify wired, fixed location telephones, for broadcast notification of alerts. This is typically used for "shelter in place" type warnings, or to advise citizens to evacuate an area. These out-calling systems are not used for collecting information about an incident nor for notifying mobile devices.

Leveraging existing technologies of communications devices, for example, cell/smart phones having the ability to transmit multimedia content at varying levels, as well as GPS and compass location awareness, the techniques disclosed herein are able to provide more comprehensive and timely information to first responders.

Public safety is actively building an IP based next generation 9-1-1 network that will provide the transport layer that can support the intelligent information transmission from the originator to the PSAP. Computer aided dispatch solutions are currently deployed at the PSAP to aid in the work assignment of emergency calls to first responders in the field. One of the exemplary features of the current technique is the manner in which the existing and planned components communicate and interact with each other.

In accordance with one exemplary technique, when a PSAP receives a call from a cellular telephone in reference to an emergent event, the speed and quality of the response may be improved by the cellular service provider's provision to the PSAP of information that includes the geographic location of the caller's phone. In a typical scenario, in which the call is from a GPS-equipped phone, the GPS coordinates of the phone may be echoed back to the PSAP in response to a specialized open "ping" request from the service provider. Of particular advantage to this approach is that GPS ping requests typically work regardless of whether a call is in progress, as long as the phone is turned on.

Even without doing a ping, the database, maintained by cellular service providers, can be used to identify all cellular devices that are currently registered to a specific tower, thereby allowing the devices near an event to be identified. For each of those devices, the service providers will have access to information that includes, but is not limited to:

The name or identity of the tower
The telephone number and/or email address and/or SIP address of the device
The feature(s) of the device such as:
    Whether the device has a pingable GPS
    The resolution of the camera
    The low-light sensitivity of the camera
    Whether the device is able to transmit streaming video
    Whether the device has specialized sensors, such as a thermometer or compass
    Zoom capabilities of the camera
    Built in flash/lighting capabilities
Bandwidth capabilities
Uplink quality
QoS metrics
Whether the device has multi-channel capabilities to handle simultaneous data and voice communications The abilities of PSAPs to access this service provider-maintained information in real-time is feasible within the framework of the proposed next generation 9-1-1 infrastructure. An exemplary technique addresses the issues described above by leveraging the anticipated tighter linkage between PSAP and service providers in the following way.

Upon receipt of a 9-1-1 call, to notify the PSAP of an emergent event, the PSAP would obtain from the cellular service providers', lists of all devices that are registered to towers near the event. For each cellular device identified as being near the event, the PSAP would be provided with one or more portions of the data listed above, such as the GPS location of the device, the name of the owner, the telephone number or email address, the SIP address, and the like of the user/device.

Upon receipt of this data, the PSAP will be able to create a "map" showing the locations, specific capabilities, and contact information for those devices. Optionally, the PSAP can receive a notification as to whether the user has opted in to assist first responders with collecting information on emergent events. The PSAP can then identify and proactively contact devices that have the ability to provide information that might not have been obtainable from the original 9-1-1 caller.

Illustratively, if someone calls 9-1-1 to report that a building is on fire, but is unable to provide an accurate description of the event, or is unable to transmit pictures of the area, the PSAP could identify camera-equipped mobile communication devices near the location of the fire and then proactively request the device owners to transmit pictures or streaming video to the PSAP.

In an exemplary implementation, the proactive contact could be an entirely automatic process including the automatic selection of which devices to contact and method of contact, e.g., automated outbound calling, email, instant messages, SMS, and the like.

Another example, of how the proposed PSAP linkage to the service provider databases may be employed is as follows:

When an in-progress crime is reported to a PSAP, the PSAP could obtain a snapshot of the cellular/mobile communication devices near the reported location. It could be useful for law enforcement purposes if a comparison of snapshots from different crimes revealed that a particular device was located near two or more of the crimes when they occur.

In accordance with another exemplary embodiment, callers to 9-1-1 centers are often unable to provide all of the information that a PSAP would like to have. In response to this problem, some PSAPs have implemented the ability to receive photographs from the cell phones of individuals who have contacted the PSAP; however, and more and more frequently, bottlenecks in the provision of information to the PSAP will be limitations in the non-voice transmission capability of the caller's device.

One exemplary technique described herein discusses a way to identify and acquire additional information from resources other than the original caller that—by virtue of their location and specific non-voice capabilities—are able to provide information that may be unavailable from the original caller.

Accordingly, one exemplary aspect is directed toward a proactive mechanism that allows PSAPs to request and acquire information from sources other than the original caller through the PSAP.

Another exemplary aspect is directed toward a PSAP's ability to define a polygon or other shape around an incident that could be stored in a shape file. Communications devices within this defined polygon or shape, regardless of the carrier, can be identified as potential devices to which the PSAP may reach-out to, to secure additional information about the emergent event.

According to another exemplary embodiment, one or more of the endpoints or communications devices involved with 9-1-1 communications are intelligent and are capable of transmitting real-time data to the PSAP.

In one exemplary embodiment a peer-to-peer network can be established with the PSAP such that real-time two-way communication between the PSAP and the one or more endpoints or mobile communications devices is possible.

In accordance with another exemplary embodiment, a modified PIDF-LO, that is a data chunk originating from the endpoint that includes such information as SIP, URL/URI, location information, and the like, is delivered to the PSAP and parsed to allow an intelligent agent process at the PSAP to parse and make decisions based, for example, on contextual information within the data chunk. The data chunk includes such information such as device capabilities, specific location (GPS and/or triangulation coordinates) device capabilities, network capabilities, etc.; in general, any information related to the device and/or its connectivity.

In accordance with another exemplary embodiment, an entity such as PSAP personnel, can be provided with, for example, a map, such as a color-coded map that graphically illustrates one or more of device location, device capabilities, and allows for the dynamic selection of one or more devices on the map to allow for, for example, the establishing of a communication channel from the PSAP to the one or more selected devices.

Another exemplary embodiment is directed toward providing PSAP dispatchers with various templates that can be used to send messages to devices of interest that are proximate to the event to assist with gathering additional information about the incident.

Even further aspects are directed toward providing one or more endpoints with information or instructions to allow the auto-setting and/or establishment of one or more resources, protocols, and communication links to allow the endpoint to communicate directly with PSAP(s).

Even further aspects are directed toward establishing one or more protocols and rule sets to allow for the automatic handling of dispatching messages to people identified within a certain area around an incident. Factors that can be taken into consideration to help with, for example, ensuring the safety of individuals is risk exposure, physical capabilities of the person associated with the endpoint, and who may be in a projected dangerous location relative to the incident.

In accordance with another exemplary embodiment, and utilizing SIP, one or more of streaming video, audio, and images can be forwarded from one or more endpoints to a PSAP with the information optionally being forwarded to a collaborative conference where, using for example an identification of an event, one or more first responders, 9-1-1 operators, field agents, and the like, are able to access the information being forwarded by the one or more endpoints.

In accordance with yet another exemplary embodiment, the PSAP can ping one or more of the identified individuals within an area proximate to an incident, using one or more of audio, SMS, a call, or the like, to ask the user associated with the device to assist with harvesting additional information relative to the incident or emergent event.

Other exemplary embodiments allow the archiving by the PSAP of any information received from any one or more endpoints.

In accordance with yet another further embodiment, location information can be used to assist with filtering inbound calls such that, for example, priority is given to inbound calls from callers who are closer to an incident than people in the surrounding area.

As discussed, people who call a 9-1-1 Public Safety Answering Point (PSAP) to report an incident, often cannot always be relied upon to describe the incident accurately because they witnessed the incident while mobile and did not stop to render help or provide the PSAP with detailed information. For this reason, emergency response personnel who are dispatched to the site of an incident may not have a clear idea of what to expect prior to arriving at the scene.

Often for larger accidents or emergencies, there can be a large number of persons dialing 9-1-1 who have passed by the accident or emergency, or who have stopped to render assistance. In such an event, the PSAP has to wade through all the callers only to find that someone who called only caught a glimpse of the emergency and did not stop, and really has no further information other than "there was an accident." Others may have actually stopped to render assistance, and are generally capable of providing additional details because they are still on the scene.

One existing capability is that cellular service providers maintain real-time databases that include the identity (e.g., telephone number) and the location (cell tower registration) of their mobile subscribers.

By knowing whether the mobile subscriber has actually stopped at the emergency site, the PSAP can utilize input from those callers to provide additional on-the-scene feedback prior to the first responders arriving. In this way, a significant improvement in the quality of PSAP alerting can be provided.

In accordance with one embodiment, if such information is considered in the process of 9-1-1 call routing, the callers with the best ability to help the PSAP dispatcher adequately understand the emergency can be accomplished without wading through several 9-1-1 calls before getting relevant and helpful information.

Some mobile devices can provide elevation information in addition to the GPS location of longitude and latitude. In the event where elevation is a critical component of providing the PSAP with emergency information prior to arrival of the first responders, considering the party's elevation can provide an important improvement in the quality of the information received at the PSAP and hence provided to the first responders.

In accordance with an exemplary embodiment, when a PSAP receives a call from a cellular telephone in reference to an emergent event, the speed and quality of the response may be improved by the cellular service provider's provision to the PSAP of information that includes the geographic location of the caller's phone. In a typical scenario in which the call was from a GPS-equipped phone, the GPS coordinates of the phone may be echoed back to the PSAP in response to a specialized "ping" request from the service provider.

As discussed, and even without doing a ping, the databases maintained by cellular service providers can be used to identify all cellular devices that are currently registered to a specific tower, thereby allowing the devices near an event to be identified. For each of those devices, the service providers can have accessed information that is discussed above.

The ability of the PSAP to have access to this service provider-maintained information in real-time, presently does not exist—but it is possible within the framework of the next generation 9-1-1 infrastructure.

An exemplary embodiment addresses the issues described above by leveraging an anticipated tighter linkage between PSAPs and service providers in the following manner.

In accordance with one exemplary embodiment, upon receipt of a 9-1-1 call notifying the PSAP of an emergent event, the PSAP would prioritize those calls with a static position relative to the event assuming that the caller had stopped on scene to render aid or pulled over to describe the emergency. Calls from such fixed location individuals generally provide the PSAP operator with additional information, the additional information typically being more valuable than a caller moving relative to the incident.

In addition to GPS longitude and latitude, the elevation of the caller and their device can provide additional information that, depending on the emergency, could be critical to accurately understanding the nature and scope of the emergency prior to the arrival of the first responders.

Illustratively, if party A was stopped on scene and party B who has remained mobile to their destination, both call 9-1-1 to report that a building is on fire, the call from party A would be routed with priority to the PSAP operator. The assumption is that the PSAP operator is likely to get a better description of the emergency from the person who stopped on scene.

In the case of a very tall building, the person who is in adjacent building at about the same elevation as the fire would be preferable for the PSAP operator to request information from than perhaps someone else driving by or at a lower floor.

So once an estimate of the floor on which the fire is burning is known, the elevation information from various callers' devices could be considered in a second round of screening and routing to the PSAP operator—An improvement in the quality of information provided and a reduction in the time to service potentially "high-value" 9-1-1 calls is thereby achieved.

While some of the exemplary embodiments discussed herein are principally targeted at 9-1-1 PSAP calls, the basic idea of doing call routing based on a static position could be useful to other environments, such as contact center type environments. There are a number of cases where a static and known position could assist in better call routing, for example, within a contact center environment.

Moreover, prioritization need not be limited to static positioning. In accordance with another exemplary embodiment, and if the emergency is a mobile emergency, such as a run-away truck, a 9-1-1 caller that is proximate to and moving along with the run-away truck, could be given priority in access to the PSAP over a caller dialing 9-1-1 who is heading the opposite direction on the interstate.

As discussed, callers to 9-1-1 centers are often unable to provide all of the information that the PSAP would like to have due to not all callers being on the scene of the emergency and instead calling during or after passing the scene.

One exemplary embodiment discussed herein describes a way to identify and acquire additional information from those callers who have a static or relatively static location proximate to or relative to the emergency.

In accordance with another exemplary embodiment, a proactive mechanism is provided that allows PSAPs to screen 9-1-1 calls and prioritize those calls from callers who have stopped and remained on the scene of an identified event.

In accordance with another exemplary embodiment, while the general notion of elevation was discussed above in regard to reporting information to the PSAP using a static person at a given altitude, a variation of this scenario could also be useful via reverse next generation 9-1-1 capabilities—specifically, if the incident is in a building, elevation can be critically important in reverse 9-1-1. For example, in some incidences, instructing individuals to move downward in the building could bring the individuals closer to the incident. In this scenario, the generic evacuate announcement would be the wrong instruction to provide in the reverse 9-1-1 notification. A better solution would be the dynamic assessment of the situation, including the integration of elevation information, to provide a perhaps more accurate instruction to individuals during the reverse 9-1-1 notification.

A similar situation is consideration of longitude and latitude in combination with elevation for the reserve 9-1-1 call. This could be important, for example, in instructing the phone user which of several stairwells to use for the safest evacuation.

The extension to this basic concept is the manner in which targeting of PSAP initiated reverse 9-1-1 calls to mobile devices would take into account whether the mobile device is detected to be toward or moving away from an emergency or a danger.

In accordance with another exemplary embodiment, call handling and routing to PSAPs is dynamically monitored and prioritized based on a correlation between the caller, such as a mobile caller, and a determined location(s) of the emergency event.

Aspects are thus directed toward improving emergency call efficiency.

Even more specifically, aspects are directed toward a proactive mechanism that allows PSAPs to request and acquire information from sources other than the original caller. Even more specifically, an exemplary aspect is directed toward identifying, contacting, and proactively requesting information from one or more individuals and/or devices in response to an emergency or an event.

Another exemplary aspect is directed toward providing a map indicating one or more individuals who may be proximate to an event and providing an automated, semi-automated, or manual method of contacting those individuals to assist with the event.

An additional exemplary aspect is directed toward determining device capabilities for devices within a particular geographic area of an event. This can include one or more of longitude, latitude, elevation, and cellular phone triangulation or tower registration information.

Additional aspects are directed toward prioritizing call handling based on proximity to an event or emergency.

Even further aspects are directed toward de-prioritizing 9-1-1 callers who are no longer proximate to an event or emergency.

Additional aspects are directed toward prioritizing 9-1-1 callers that are known to be coincident with or static (position wise) relative to an event.

Aspects further relate to and recognize that some people seeing an emergency would call 911 while still driving and others would stop and call. However, it is entirely possible (maybe even probable) that a person of the latter type would get out of their vehicle and walk around to seek a better vantage point. Here, the person who stopped and called could probably provide greater information about the emergency.

In accordance with another exemplary embodiment, one or more of statistical information, road information, map information, GPS information and topological information are included in the analysis to assist with determining whether to prioritize a caller. More specifically, a predictive analysis can be performed that analyses such information as speed and direction of a caller, whether a caller "could" have witnessed an event (e.g., is the caller on the same road as the event; based on topography could the caller have even seen the event, etc.), whether the call may be calling about a new event, and does the caller's behavior indicate there could be a new event (e.g., the caller is on a known highway but only travelling 5 m.p.h and the average speed on this highway is 75 m.p.h.)

In another exemplary embodiment, GPS information (optionally plus topographic information) is considered in determining or predicting if a caller could have even seen event. This information can be coupled with statistical probability information and/or a determination to assess whether a caller was on a road that went by event (by referencing a road map).

Another exemplary embodiment is directed toward:
receiving one or more calls, and for each call, and before each call is answered, determining if a caller is moving and if so the rate of movement; and
based on the location and determining whether a caller is moving and the rate of movement either:
resequencing a call wait queue prioritizing calls that are proximate to or have a low rate of movement relative to the emergent event, or
resequencing a call wait queue de-prioritizing calls that are not proximate to or have a high rate of movement relative to the emergent event.

In accordance with another optional embodiment, PSAP's can request from one or more cellular providers history information regarding where a phone has been. This information can include one or more of cell tower registration information, GPS information and triangulation information. This history information can also assist with determining whether an inbound call is about an existing even or a new event. For example, if history information shows that a caller over the past 10 minutes has been moving away from an event, it could be assumed the caller is calling about a new event. In another scenario, the history information could reveal the caller was never on a road where there is a current incident. An assumption could then be made that there is a greater likelihood the caller is calling about a new event. These types of assumptions could be based on one or more rule sets and probability factors, and could also integrate any of the other types of information discussed herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any non-transitory, tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, DVD, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, this disclosure is considered to include a tangible storage medium or distribution medium and prior art-recognized equivalents and successor media, in which the software implementations of the present embodiments are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the embodiments are described in terms of exemplary embodiments, it should be appreciated that individual aspects of the embodiments can be separately claimed.

The preceding is a simplified summary of the embodiments to provide an understanding of some aspects of thereof. This summary is neither an extensive nor exhaustive overview of the various embodiments. It is intended neither to identify key or critical elements of the embodiments nor to delineate the scope of the embodiments but to present selected concepts of the embodiments in a simplified form as an introduction to the more detailed description presented below. As will be appreciated, other embodiments are possible utilizing, alone or in combination, one or more of the features set forth above or described in detail below.

BRIEF DESCRIPTION OF THE DRAWINGS

The exemplary embodiments disclosed herein will be discussed with relation to the figures wherein.

DETAILED DESCRIPTION

The techniques will be illustrated below in conjunction with an exemplary electronic communications system, such as a mobile communication system and infrastructure. Although well suited for use with, e.g., a system using a computer/electronic device, server(s), communications devices, mobile communication device(s), and/or database(s), the embodiments are not limited to use with any particular type of electronic device(s) or system or configuration of system elements. Those skilled in the art will recognize that the disclosed techniques may be used in any application in which it is desirable to provide enhanced collaboration and communication capabilities.

The exemplary systems and methods will also be described in relation to software (such as drivers), modules, and associated hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the embodiments. It should be appreciated, however, that the techniques disclosed herein may be practiced in a variety of ways beyond the specific details set forth herein.

Figure 1:
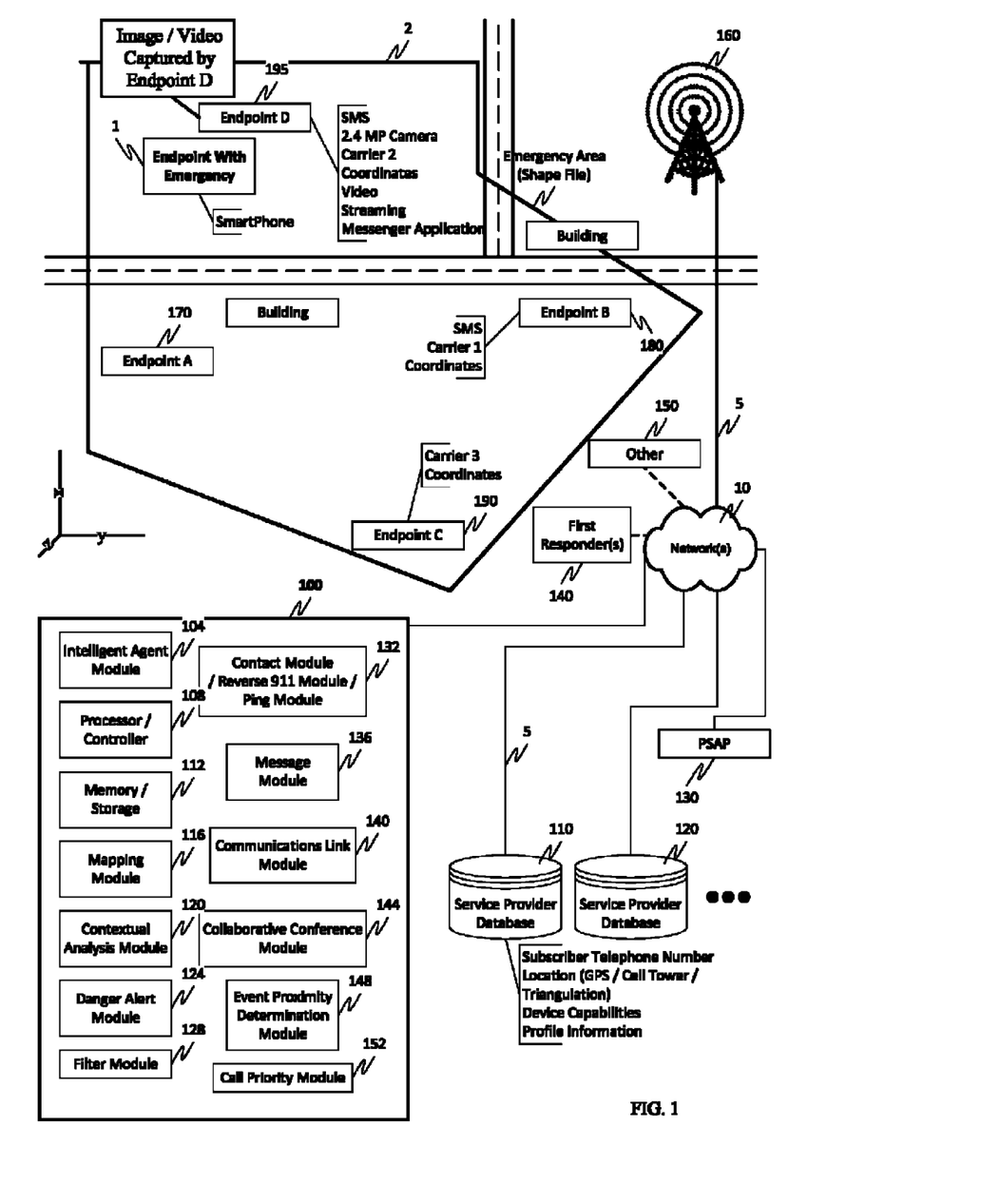
FIG. 1 illustrates an exemplary communication environment.

FIG. 1 illustrates an exemplary communications environment. The communications environment includes an enhanced communication handler 100, connected via one or more links 5 and networks 10, one or more service provider databases, such as service provider database 110 and 120, one or more PSAPs 130, one or more first responders 140, one or more other entities 150, and one or more cell towers 160.

The enhanced communications handler 100, in addition to well known componentry, includes an intelligent agent module 104, processor/controller 108, memory/storage 112, mapping module 116, contextual analysis module 120, danger alert module 124, filter module 128, contact module/reverse 9-1-1 module/ping module 132, message module 136, communications sync module 140, collaborative conference module 144, event proximity determination module 148 and call priority module 152.

The communications environment further includes one or more endpoints such as endpoint 170, 180, 190, 195 and 1.

As discussed, an exemplary embodiment assists with providing first responders with additional information related to an emergency. In general, an exemplary embodiment will be directed toward an emergency type of situation such as when 9-1-1 calls are received from one or more endpoints' users that have or have witnessed an emergency. The exemplary techniques assist with providing one or more entities such as first responders, additional information about the emergency. However, it should be appreciated that in general, the techniques and solutions discussed herein can be applied to additional environments outside of the emergency and 9-1-1 environment.

In operation, a 9-1-1 call is received from, for example, an endpoint 1 that has an emergency. This received call is routed via one or more links 5 and networks 10 to PSAP 130. PSAP 130 performs one or more of a GPS ping request, obtains cell tower registration information, and obtains triangulation information to assist with determining the location of the endpoint 1. The GPS ping request would result in GPS information (from a GPS enabled endpoint) to be returned to the PSAP 130, with this information optionally being stored in memory/storage 112. The cell tower information could similarly be acquired by the PSAP 130, such that as the call is received by the PSAP 130, an identification of the cell tower(s) that is handling the call can be forwarded to the PSAP 130, with the cell tower information also optionally being stored in memory/storage 112. Triangulation information could also be secured for the endpoint with the triangulation information (an approximate location of the endpoint) again being forwardable to the PSAP 130 and stored in memory/storage 112.

Moreover, capability information can be acquired from the endpoint 1, such as device type, device capabilities, carrier information, carrier capabilities, current communications link capabilities, and in general, any information related to the device itself and/or how the device is communicating with the PSAP 130 over one or more network legs.

In optional exemplary embodiment, and instead of determining the location of the endpoint 1 that has the emergency, in an automated or semi-automated manner a 9-1-1 call could be received by a PSAP, and the PSAP determine that the emergency is at location X, e.g., the corner of $2^{nd}$ and Main.

As discussed, an exemplary embodiment is directed to one of obtaining additional information regarding a particular event or emergency associated with an endpoint. Accordingly, and in cooperation with the reverse 9-1-1 module and ping module 132, a shape file 2 can optionally be generated. This shape file can be generated one or more automatically, semi-automatically, or with the assistance of, for example, a PSAP operator(s). In general, the shape file should attempt to identify a geographic area within which individuals may have access to information that can assist with helping first responders 140 respond to the emergency associated with endpoint 1. In accordance with one exemplary embodiment, shape file 2 has been generated around endpoint 1 in an automated manner based on a threshold in the reverse 9-1-1 and ping module 132. In accordance with one exemplary embodiment, this exemplary threshold was set to one city block from the endpoint 1; however, it should be appreciated that this threshold can be set to any value and can be based on one or more of distance, contextual analysis of the emergency (e.g., if the emergency is a multi-building fire, individuals within 2 or 3 blocks could have valuable information about the emergency) or in general be based on any value or combination of values and/or metrics. One or more rules could also be established that help with a contextual analysis of how the reverse 9-1-1 module and ping module 132, in cooperation with a contextual analysis module 120, determine the perimeter of the shape file 2.

Once the shape file 2 has been generated, and in cooperation with the intelligent agent module 104, the one or more devices that are in the shape file area are determined by querying one or more service provider databases such as service provider database 110 and/or 120.

Even more specifically, and in accordance with one exemplary embodiment, a GPS ping request could be initiated to all devices that are currently associated with cell tower 160. In accordance with another optional embodiment, intelligent agent module 104, knowing the cell tower, here cell tower 160, is communicating with endpoint 1, can request from the service provider(s) to provide a list of all endpoints currently in communication with that cell tower and in accordance with yet another exemplary embodiment, the PSAP 130, cooperating with the intelligent agent module 104, and ping module 132, as well as information in one or more service provider databases, reconciles which one or more endpoints are within the shape file 2.

Once the device(s) have been identified within the shape file 2, the intelligent agent module 104, cooperating with processor/controller 108 and memory/storage 112, obtains available device and profile information from one or more service provider databases. This device and profile information can include but is not limited to phone number information, location information, elevation information, name information, email address information, Session Initiation Protocol (SIP) information, and device specific information include but not limited to device capabilities including messaging capabilities, camera capabilities, carrier capabilities, communication link capabilities, coordinate information, GPS location, video camera capabilities, streaming capabilities, messenger application capabilities, and optionally whether or not the user associated with the endpoint has opted in and volunteered for assistance with emergencies.

Additionally, the profile can include further information such as gender, age, physical disabilities, or any other information that may be relevant in assisting the system to determine whether or not a user associated with that endpoint is a proper candidate for providing additional information about the emergency. As discussed hereinafter in greater detail, this information can be utilized by the contextual analysis module 120, cooperating with the intelligent agent module 104, and the message module 146, to determine whether an assistance request message should be sent to a particular endpoint(s).

Knowing the devices and capabilities of the endpoints (devices) within the shape area 2, and in cooperation with the mapping module 116, a map can optionally be generated that graphically includes information such as the location of the event or emergency, and the location of the various endpoints within the shape relative to the emergency/event. This map can include or be overlaid with other information such as topography information, street information, satellite imagery information, and in general can include any information that is typically available with the various types of available maps. In addition, with the location of the various endpoints on this map, the mapping module 116 can also make the map interactive with which an operator associated with the PSAP 130 can manually select one or more devices. The selection of the one or more devices enabling the PSAP operator to establish a communication session or forward a request to that endpoint asking for, for example, the user associated with the endpoint to provide additional information as discussed here and after.

The message module 136, cooperating with the intelligent agent module 104, processor/controller 108, memory/storage 112 and contextual analysis module 120, utilizing information from one or more service provider databases, operates with the contact module 132 to determine which one or more endpoints within the shape file to contact. As discussed, and based on the nature of the emergency, the intelligent agent module 104 cooperating with the contextual analysis module 120 can perform an intelligent analysis of the available information in an attempt to determine which endpoint is more better suited to provide information to the PSAP regarding the emergency at endpoint 1.

For example, if the emergency associated with endpoint 1 is an auto accident, and based on the geographic proximity and location of endpoint A 170 and endpoint D 195 to the auto accident, the contact module 132 could initiate a message, in cooperation with the message module 136, to endpoints A 170 and endpoint D 195 to request they provide photographs of the accident. However, in accordance with this exemplary embodiment, endpoint A 170 does not have smart phone-like capabilities, or the information about that endpoint's capabilities is simply not available.

Alternatively, or in addition, endpoint A 170 may not have an appropriate data connection to cell tower 160 such that endpoint A is capable of providing any information to the PSAP 130. In contrast endpoint D 195 has a number of capabilities, as shown in the capability information associated with that endpoint. The contextual analysis module 120 recognizing this information could then instruct the message module 136 to contact endpoint D 195 via a message asking the user associated with endpoint D to provide information about the emergency, such as a picture(s).

There are a number of different ways in which endpoint D 195 can be contacted to provide additional information about the emergency. In accordance with a first exemplary embodiment, the message module 136 generates an outbound call to endpoint D 195, with an automated message requesting the endpoint provide additional information about the emergency. In accordance with another exemplary embodiment, the message module 136 cooperating with the intelligent agent module 104 and PSAP 130, initiate a call to endpoint D 195 such that the PSAP operator can directly communicate with the user associated with the endpoint. In accordance with another exemplary embodiment, an SMS or text message can be sent by the message module 136 to the endpoint. In yet another exemplary embodiment, a message associated with the messenger application can be sent to the endpoint. With any of these contact modalities to the endpoint, the message forwarded to the endpoint can be very general in nature such as "can you provide additional information about the car accident next to you" to very specific information such as "please begin streaming video with your phone pointed in an eastward direction down Main Street." This request for information can of course be provided one or more of audibly or graphically, as well as the endpoint automatically configured to assist the user with providing the requested content.

For example, in an above scenario where the user associated with endpoint D is requested to provide very specific information such as to start streaming video streaming with the camera pointed in an eastward direction down Main Street, message module 136 can include instruction information in the message such that the video camera is enabled and the necessary protocols and communication links to allow streaming of the video content to be provided to the PSAP 130. The message could optional include graphical assistance to help the user point the camera in the correct direction. For example, a rotatable arrow could be shown on the display of the endpoint, the arrow pointing in the direction the PSAP would like for the user to point the camera in.

In addition, any necessary media channels and/or SIP communication links can be automatically initiated to facilitate the transmission of obtained information from the information securing endpoint back to the PSAP 130.

In accordance with another optional exemplary embodiment, an event ID can be associated with the information obtained from the one or more endpoints. This event ID can be used as the basis for commencing a collaborative conference such that one or more first responders 140 and other entities 150 can also share and view the information received from the one or more information gathering endpoints.

In addition, and again in cooperation with the mapping module 116, the map can be dynamically updated as information is received and as various endpoints enter and exit the shape file area 2 with the map optionally including the images/video received from the endpoint. These received images/video can be overlaid on the map such that the geographic proximity of the user forwarding the information can be graphically correlated to the event or emergency. For example, and as shown in FIG. 1, the image/audio/video captured by endpoint D is shown in a balloon associated and next to endpoint D 195.

It is to be appreciated that the information, endpoints, messaging, mapping, and the like, need not be static in nature but it can be dynamic and updated as, for example, various endpoints enter or leave the shape area as additional information is available from one or more endpoints and as the event or the emergency changes. Additionally, further messages can be sent with the cooperation of the message module 136 to one or more of the endpoints that, for example, request a different type of information, request the user to take additional photos, provide additional video, change camera settings, change video settings, point the camera or video camera in a different direction, and in general provide any additional information that could be the result of an additional query or request for information sent by the message module 136 to the endpoint.

Moreover, it should be appreciated that the message(s) sent from the message module 136 can be dynamic in nature such that if the message request to the user is "start streaming video with the camera facing in an eastward direction," information can be secured from the GPS unit on the device that assists with the system determining what is the current direction the device is facing, and providing feedback to the user either graphically or audibly to assist the user in getting the device pointed in the eastward direction.

As information is assembled from one or more devices, this information can be associated or tagged with an event ID. This event ID can be used with the cooperation of the collaborative conference module 144 to allow one or more entities such as first responders 140 and other entities 150, to access the information using the associated event ID. This would allow, for example, multiple entities that are trying to manage an emergency, to view information being forwarded from the one or more endpoints, from their respective locations. As will be appreciated, this information can be forwarded to a static location, such as a fire department, police department, or the like, and it could also be forwarded to one or more mobile locations such as a mobile device in a fire truck that is responding to the emergency.

In accordance with an optional exemplary embodiment, and in cooperation with a danger alert module 124, the techniques disclosed herein can also be used to assist users associated with an endpoint to avoid danger. For example, if there is an event or an emergency, the danger alert module 124 cooperating with the contact module 132 and message module 136, optionally in cooperation with the contextual analysis module 120, can identify endpoints that are proximate to an event or an emergency and advise those endpoints as to how to avoid the event or emergency. The message instructing users associated with endpoints how to avoid an event or emergency can be automatically or semi-automatically generated in cooperation with a contextual analysis module 120 and can be provided from, for example, an operator associated with the PSAP 130, or some combination thereof. This can be implemented in a similar manner to land-line based reverse 9-1-1 where information is sent to the endpoints that are determined to be within an "area of concern." To implement such a technique in the mobile domain, once an area is defined, the PSAP would contact all service providers serving the defined geographic area and secure location information from the endpoints being serviced—for example through a ping request, triangulation calculation, cell tower registration lookup, or some combination thereof. The location information would then be correlated with the defined area with devices within that area receiving a message and devices outside the area not receiving a message. This determining of devices within the defined area can be updated on a predetermined basis appreciating that the devices are mobile communications devices and could be mobile.

It is to also be appreciated that the defined area may or may not coincide or overlap with the area defined by the shape file. For example, if the emergency is a chemical spill, it may be advantageous to send evacuation notices to an area of much larger geographic coverage, than that of the shape file, where endpoints are being sent requests for additional information. There could also be multiple defined area and/or shape files for an event or emergency, with one or more of the defined area(s) or shape file(s) having portions that overlap.

As discussed above, in addition to GPS information such as longitude and latitude information, elevation information can also be taken into consideration by the enhanced communication handler 100 to assist with providing additional granularity and accuracy for the techniques disclosed herein. Additionally, it should be appreciated that the system can be scaled such that multiple PSAPs, multiple different types of first responders, and multiple other entities could all be included for, for example, a larger scale emergency. Cross-agency and inter-agency cooperation could also be facilitated through the use of the collaborative conference module 144 with the sharing of information providing, for example, greater ability for the danger alert module 124 to contact the appropriate users who are in danger, and the ability to secure the needed information to assist handling the event or emergency by the various agencies involved.

In accordance with another exemplary embodiment, the map provided to the PSAP can not only be dynamic, but can also be color-coded to assist with, for example, quick and accurate determination of device capabilities. This can be supplemented with graphical information such as icons to further assist with readily ascertaining device capabilities. For example, next to an icon representing a particular endpoint, additional icons can be shown such as a camera, video camera, user name associated with the endpoint, picture of the user associated with the endpoint, and the like.

In accordance with yet another exemplary embodiment, a peer-to-peer network can also be established between an endpoint and the PSAP that allows, for example, for real-time collaboration and exchanging data. This peer-to-peer network can be established with the assistance of the information included in the service provider database such as the device capabilities, carrier information, SIP information, and/or MAC address information.

In accordance with yet another exemplary embodiment, one or more portions of the information collected by the PSAP 130 can be stored for archiving for use, for example, by local or federal law enforcement officials, or the like.

In accordance with yet another exemplary embodiment various protocol rule sets can be established that can be reconciled with, for example, contextual analysis to assist with the generation and forwarding of the one or more of the messages or requests for information sent back to endpoints in an identified emergency area or shape file. These various protocols and rule sets can take into consideration one or more of user safety, nature of the emergency, location of the emergency, potential impact of the event or emergency, user abilities or handicaps, or the like.

In accordance with yet another exemplary embodiment, endpoints identified within the emergency area or shape file can optionally be handled in a different manner than other devices calling, for example, 9-1-1. More specifically, if endpoint 1 has an emergency, and endpoint B 180 were to initiate the first call to 9-1-1 indicating that they had witnessed an emergency and requested assisted for the user associated with endpoint 1, if at a later point endpoint C 190 calls 9-1-1 to report the same emergency, knowing that endpoint C 190 is located within the emergency area defined by a created shape file, an automated message could be provided to the user associated with endpoint C 190 saying, for example, "The car accident at the corner of Main and First Street has been reported; if you have additional information or are reporting an additional emergency, press 1 to continue."

Figure 2:
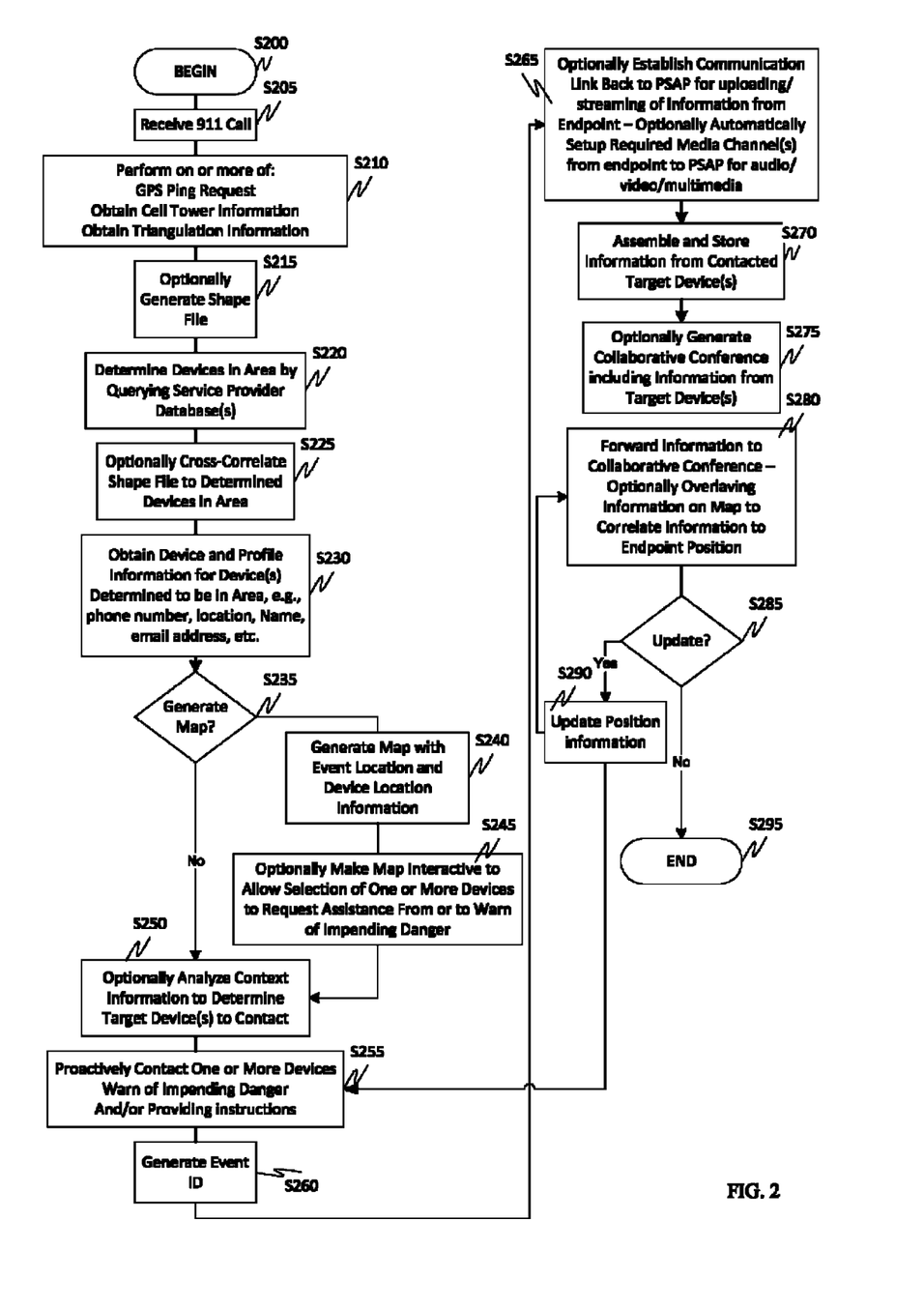
FIG. 2 is a flowchart illustrating an exemplary method for optimizing 9-1-1 call handling.

FIG. 2 illustrates an exemplary method for providing enhanced communication. In particular, control begins in step S200 and continues to step S205. In step S205, a 9-1-1 call is received. Next, in step S210, one or more of the following are performed: a GPS ping request, the obtaining of cell tower information, and the obtaining of triangulation information for the device placing the 9-1-1 call. Then, in step S215, a shape file can optionally be generated that generally corresponds to an emergency area. As discussed, the shape file can be generated automatically, semi-automatically, or by entity or individual, such as a PSAP operator, first responder, law enforcement officer, or the like. Control then continues to step S220.

In step S220 the devices within the shape file are determined using the information from the one or more service provider databases. Next, in step S225, the devices preliminarily identified to be within the shape file area can be optionally confirmed by cross-correlating the shape file to the obtained GPS information from the ping requests that were sent to the devices determined to initially be in the area in step S220—such secondary location determining providing greater granularity for device location. This 2-stage location determining process may also have speed advantages in that there could be a slight delay in obtaining GPS information, where cell tower registration may be more readily available. Then, in step S230, one or more of device and profile information for a user associated with the device can be obtained, with this information including any one or more of phone number information, name information, location information, email address information, messenger application handle, and the like. Control then continues to step S235.

In step S235, a determination is made as to whether a map should be generated. If a map is to be generated, for example, for display to a PSAP operator, control continues to step S240 with control otherwise jumping to S250.

In step S240, a map is generated with an indication of the event location and the locations of devices in the emergency area. Next, in step S245, the map can optionally be made interactive which allows, for example, a PSAP operator to select one or more of the devices to which a request for assistance can be sent or a warning sent regarding impending danger. Control then continues to step S250.

In step S250, context information can optionally be analyzed to assist with determining which devices should be identified as target devices to contact within the emergency area. Once the target devices have been identified, in step S255, target devices can be contacted to one or more of warn of impending danger, provide instructions, and/or query the user as to whether or not they would like to assist with providing information to the PSAP. Control then continues to step S260.

In step S260, an event ID is generated that can be associated with the information received from one or more endpoints. This event ID being useable, for example, to share the information as discussed hereinafter.

In step S265, a communication link can optionally be established between one or more endpoints and the PSAP, the communication link useable for uploading or streaming of information from the endpoint to the PSAP and/or other entity. This communication like can optionally automatically be setup with the required media channels and necessary routing information to allow the endpoint to send the PSAP one or more of audio information, video information, multimedia information, and the like. This communication channel can also be used for further communication from the PSAP back to the endpoint, the communication link optionally including a push-to-talk capability. Next, in step S270, various information received from the one or more endpoints is assembled and stored. Then, in step S275, a collaborative conference can optionally be generated that allows, for example, the sharing of information received from one or more of the targeted devices. Control then continues to step S280.

In step S280, the collected information can optionally be forwarded to a collaborative conference, optionally in conjunction with the assembled map with the capability of overlapping and combining any one or more of the types of information discussed herein. Control then continues to step S285.

In step S285, a determination is made as to whether endpoint position information, map information, endpoints within the emergency area, endpoints leaving the emergency area, or in general whether any or all of the information should be updated. If the information should be updated, in step S290, the various types of information are updated with control jumping back to step S280 and/or S225 as necessary. Otherwise, control jumps to step S295 where the control sequence ends.

In accordance with another exemplary embodiment 9-1-1 calls are prioritized based on proximity to an event such as whether a caller is "static" with the event, or moving away from the event. The techniques disclosed in accordance with this embodiment can also be combined with the above-described technology to further enhance 9-1-1 functionality.

In operation, a 9-1-1 call is received from a caller at the PSAP 130. Next, and in cooperation with the call priority module 152, processor/controller 108, and memory/storage 112, a determination is made as to whether there are more agents than calls. If there are more agents than calls, the call is answered by an operator associated with the PSAP 130. Otherwise, if there are not more agents than calls, and in cooperation with the event proximity determination module 148, and before the call is answered, a determination is made as to whether the caller is moving. This determination can be based on a multi-step analysis including determining caller ID information about the caller (from this it is easy to determine whether the caller is calling from a land line—and thus stationary) by performing a GPS ping request, or multiple ping requests, and then comparing the information to determine if the caller is moving, in a similar manner, looking at cell tower registrations, and/or triangulation information over a period of time and compare the results of each test to determine if the caller is moving.

The event proximity determination module 148 then determines if there are a number of received calls, e.g., a cluster of calls to the PSAP that generally correspond to the approximately same geographic area as an identified emergency or event. This identified emergency or event can be automatically, semi-automatically, or manually recognized by the system. For example, an operator associated with the PSAP, upon taking a call, is told that there is a car accident at 26$^{th}$ and Oak. This information can be maintained by the event proximity determination module 148, in cooperation with the processor 108 and storage 112, to assist with determining whether received calls are in the approximately same geographic location or area as the identified event or emergency.

The event proximity determination module 148, cooperating with the filter module 128 and call priority module 152, makes a determination as to whether the call is proximate to or stationary with an identified event. If the call is proximate to or stationary with an identified event (for example by comparing GPS coordinates or other location information), a call wait queue that is managing the received cluster of 9-1-1 calls is re-sequenced with priority given to calls proximate to or stationary with the event or emergency.

However, if it is determined that the call is not proximate to, or stationary with the identified event, such as if the caller is moving away from an identified emergency or event, the call in the wait queue is de-prioritized such that callers who are proximate to or stationary with the event have their calls answered first by the PSAP operator. This process can continue until all calls have been answered at which point the expiration of the location associated with the event or emergency can be cancelled.

If, however, a call is answered and it is determined that there may be a new event or emergency at a new location, one or more of an automatic, semi-automatic, or manual indication of this new event can be maintained by the system such that the determining step discussed above, regarding whether a caller is in the generally same approximately geographic area of the identified event, can consider this new information for calls received at the PSAP.

While this exemplary technique discussed prioritizing and de-prioritizing of calls based on proximity or "staticness" with an identified location or event, these techniques can be expanded such that a prioritization/de-prioritization is handled across multiple events at multiple locations. In these instances, where there are multiple events at multiple locations, re-sequencing of the wait queue generally operates in the same manner for calls that are proximate to or static with an event being prioritized over mobile callers that are, for example, moving away from the event/emergency.

As with the prior-discussed embodiments, elevation can also be taken into consideration when making the determining steps and managing the call handling (prioritization and de-prioritization) as discussed above.

As an illustrative exemplary scenario, a first party has stopped on the scene of a building fire. A second party, who was driving by the fire, calls 9-1-1 to report that a building is on fire from their mobile phone. As the second party's call is ringing at the PSAP, a GPS ping request goes out to determine a first location of the second party. As soon as the PSAP receives a response to the first GPS ping request, a second (or more) ping requests are also sent to the second party with the responses thereto being assembled and compared to previous responses to the ping request to determine if the second party is moving. In this exemplary scenario, it is determined that the first party has stopped at the scene of the fire, while the second party appears to be driving, and on the move. Here, the first party's call to the PSAP would be routed with priority to a PSAP operator—the assumption is that the PSAP operator is likely to get a better description of the emergency from the person who is on the ground, at the scene of the building fire.

As discussed, in the case of a very tall building, a person who is in an adjacent building at approximately the same elevation as the fire, could be a preferable priority call for the PSAP operator to request information from. Therefore, once an estimate of the floor of the fire is known (or the information is provided to a PSAP), elevation information could also be considered in a second round of screening and call routing to the PSAP operator with a resultant prioritization or de-prioritization of the call based on this second round of screening.

Figure 3:
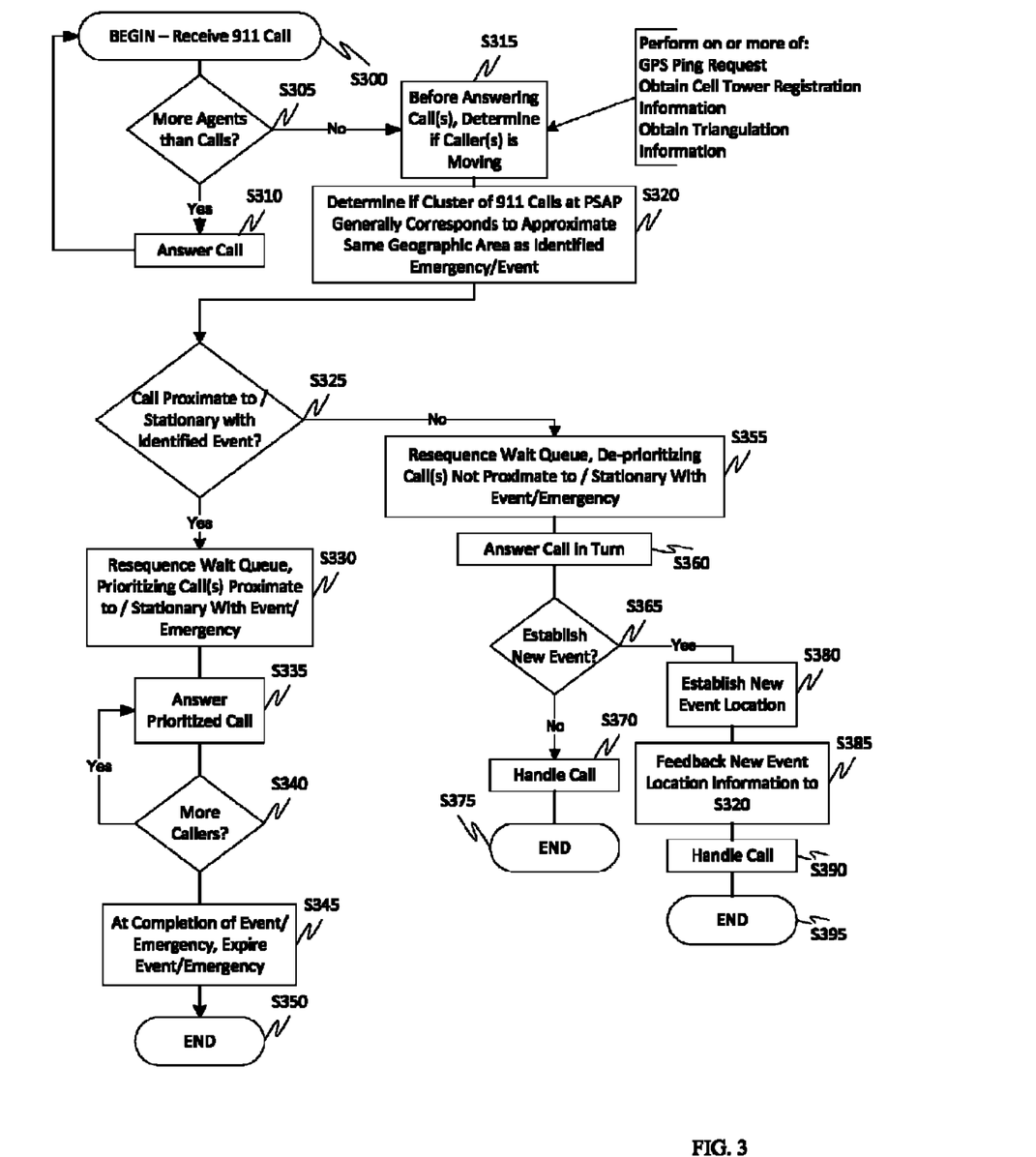
FIG. 3 is a flowchart illustrating another exemplary method for optimizing 9-1-1 call handling.

FIG. 3 outlines an exemplary method of prioritizing calls. In particular, control begins with step S300 with a 9-1-1 call being received, with control continuing to step S305. In step S305, a determination is made as to whether there are more agents than incoming calls. If there are more agents than incoming calls, control continues to step S310 and the call is answered with control jumping back to S300.

Otherwise, control continues to step S315 where, before the call is answered, a determination is made as to whether the caller is moving. Even more specifically, one or more of a caller-ID lookup, GPS ping request, cell tower registration information, and triangulation information can be used to determine whether a caller is moving. Next, in step S320, a determination is made as to whether a cluster of 9-1-1 calls are being received at the PSAP, with the determined location of the cluster of calls generally corresponding to an approximate same geographic area as an identified emergency or event. Then, in step S325, a determination is made as to whether a call is proximate to or stationary with (e.g., static) with an identified emergency or event.

If a device associated with a call is determined to be proximate to or stationary with an identified event or emergency, control continues to step S330 with control otherwise jumping to step S355.

In step S330, a call wait queue is re-sequenced such that devices associated with the calls that are determined to be proximate to or stationary with the identified event or emergency location are prioritized. Next, in step S335, the prioritized calls are answered with control continuing to step S340.

In step S340, a determination is made as to whether there are more callers in the queue. If there are more callers in the queue, control jumps back to step S335, where a next call is answered, with control otherwise continuing to step S345.

In step S345 and upon completion or closure of the event or emergency, the event or emergency is expired and the location information that is used in step S320 being deleted from consideration. Control then continues to step S350 where the control sequence ends.

In step S355, the call wait queue is re-sequenced, with a de-prioritization of inbound calls for devices that are determined not to be proximate to or stationary with an identified event or emergency.

In step S360, these calls are again answered in turn with control continuing to step S365.

In step S365, a determination is made as to whether a new event should be established. If a new event is to be established, control continues to step S380 with control otherwise jumping to step S370.

In step S370, the calls in the queue are handled or answered until there are no calls left at which point control continues to step S375 where the control sequence ends.

In step S380 a determination is made as to whether the caller is calling about a new event or emergency for which a new event location should be established. If a new event location should be established, in step S385, the new event location is generated with this information fed back to the determining step in S320. The call(s) is then handled in step S390 with control continuing to step S395 where the control sequence ends.

In accordance with an optional exemplary embodiment, step S320 can be supplemented with a further determination as to whether it appears that a cluster of calls could be for the same event, or a different event. For example, if statistical information is available that shows 9-1-1 call volumes for specific areas, optionally over specific frames, this information can be used to assist with determining whether a particular cluster of received calls, even though they may generally correspond to an approximately similar geographic area, are predictably related to the same event or emergency.

In accordance with another exemplary optional embodiment, the PSAP operators are capable of entering location information associated with an event into the queue manager that manages the prioritization/de-prioritization of incoming 9-1-1 calls.

Even further, and in accordance with an optional additional exemplary embodiment that is an extension to techniques disclosed in relation to FIG. 2, the combination of the prioritization/de-prioritization of inbound 9-1-1 calls can take into consideration the non-voice capabilities of the device. For example, the system or a PSAP operator determines that having image information related to an event is critical. This need or image information can be used in conjunction with or as overriding information in determining the prioritization/de-prioritization of a 9-1-1 call in the call queue. For example, if a cluster of 12 calls is arriving at a PSAP, and it is determined that all 12 calls, based on the databases' location information, have a statistical probability that they are from the same event, but a PSAP operator knows that they need either pictures or videos of the event, prioritization and re-sequencing of the queue could be implemented such that the queue prioritizes callers whose devices: are static with the event, have a camera, and are on a carrier that supports the transfer of images to the PSAP.

While the above-described flowcharts have been discussed in relation to a particular sequence of events, it should be appreciated that changes to this sequence can occur without materially effecting the operation of the embodiments. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems described herein is dependent on the speed and/or efficiency requirements of the system, the particular function, and the particular software or hardware systems or microprocessor or microcomputer systems being utilized. The security systems, methods and protocols illustrated herein can be readily implemented in hardware and/or software using any known or later developed systems or structures, devices and/or software by those of ordinary skill in the applicable art from the functional description provided herein and with a general basic knowledge of the computer and security arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods described herein can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided systems, apparatuses and methods for facilitating call handling and information acquisition. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method that facilitates the securing of information about an emergent event comprising:
   receiving a call from a caller and determining a location of the emergent event;
   defining an area relative to the location;
   identifying, based on a query, one or more devices other than the caller within the defined area;
   obtaining capability information about the one or more identified devices;
   analyzing one or more of the device capability information and communication network information;
   identifying one or more target devices within the defined area to contact based on the analyzed device capability and communication network information; and
   proactively contacting the one or more target devices for the purpose of exchanging information related to the emergent event.

2. The method of claim 1, wherein the defined area is represented by a shape file.

3. The method of claim 1, wherein the capability information includes one or more of:
   pingable GPS information,
   camera resolution information,
   camera low-light sensitivity information,
   streaming video capabilities,
   specialized sensor information,
   camera zoom capabilities,
   flash/lighting capabilities,
   bandwidth capabilities,
   uplink quality,
   QoS metrics, and
   multi-channel information indicative of whether the device can support simultaneous data and voice communications.

4. The method of claim 1, further comprising generating a map illustrating target device locations, emergent event location and the defined area.

5. The method of claim 1, further comprising receiving content as a result of the contacting of the one or more devices, the content identified with an event identifier.

6. The method of claim 5, further comprising utilizing the event identifier to share the received content in a collaborative conference.

7. The method of claim 1, wherein the contacting of the one or more target devices includes a request for one or more of audio, video and streaming video of the emergent event.

8. The method of claim 1, wherein the contacting of the one or more target devices includes sending instructions regarding warning of danger.

9. The method of claim 1, wherein the one or more devices are mobile communications devices.

10. A plurality of means for performing the steps of claim 1.

11. A non-transitory computer-readable information storage media having stored thereon instructions, that when executed by a processor, cause to be performed the steps of claim 1.

12. A system that facilitates the securing of information about an emergent event comprising:
   a PSAP (Public Safety Answering Point) that receives a call from a caller and determines a location of the emergent event;
   a contextual analysis module that defines an area relative to the location;
   a ping module that identifies, based on a query, one or more devices within the defined area other than the caller and obtains capability information about the one or more identified devices;
   an intelligent agent module that analyzes one or more of the device capability information, within the defined area, and communication network information and identifies one or more target devices to contact based on the analyzing of the device capability and communication network information; and
   a contact module that proactively contacts the one or more target devices for the purpose of exchanging information related to the emergent event.

13. The system of claim 12, wherein the defined area is represented by a shape file.

14. The system of claim 12, wherein the capability information includes one or more of:
   pingable GPS information,
   camera resolution information,
   camera low-light sensitivity information,
   streaming video capabilities,
   specialized sensor information,
   camera zoom capabilities,
   flash/lighting capabilities,
   bandwidth capabilities,
   uplink quality,
   QoS metrics, and
   multi-channel information indicative of whether the device can support simultaneous data and voice communications.

15. The system of claim 12, further comprising a mapping module that generates a map illustrating target device locations, emergent event location and the defined area.

16. The system of claim 12, wherein content is received as a result of the contacting of the one or more devices, the content identified with an event identifier.

17. The system of claim 16, further comprising a collaborative conference module that utilizes the event identifier to share the received content in a collaborative conference.

18. The system of claim 12, wherein the contacting of the one or more target devices includes a request for one or more of audio, video and streaming video of the emergent event.

19. The system claim 12, wherein the contacting of the one or more target devices includes sending instructions regarding warning of danger.

20. The system of claim 12, wherein the one or more devices are mobile communications devices.

* * * * *